Feb. 18, 1969 E. M. GYORGY ET AL 3,428,144

ELASTIC WAVE ELEMENTS

Filed July 7, 1966 Sheet 1 of 2

INVENTORS E. M. GYORGY
R. C. LE CRAW
L. G. VAN UITERT

BY George S. Indig
ATTORNEY

United States Patent Office 3,428,144
Patented Feb. 18, 1969

3,428,144
ELASTIC WAVE ELEMENTS

Ernst M. Gyorgy and Roy Conway Le Craw, Madison, and Le Grand G. Van Uitert, Morris Township, N.J., assignors to Bell Telephone Laboratories, Incorporated, Murray Hill, N.J., a corporation of New York Filed July 7, 1966, Ser. No. 563,569
U.S. Cl. 181—.5 13 Claims
Int. Cl. G10k *10/00*

ABSTRACT OF THE DISCLOSURE

The use as solute of small quantities of manganese in magnetic garnet compositions such as YIG results in sharply enhanced dependence of elastic wave velocity on applied magnetic field. Devices advantageously including such compositions include variable delay time delay lines and variable frequency elastic wave resonators.

This invention relates to materials manifesting magnetic field-dependent elastic wave velocities and to devices utilizing such materials.

The past several years have seen an ever-expanding interest in elastic wave technology. As a cause or outgrowth of this interest, there has emerged a family of devices serving as frequency standards, delay lines, sonar elements, phonograph pickups, and various types of electromagnetic wave modulators.

Many of these devices depend for their utility upon very precisely determined resonant frequencies, delay times, or other characteristics, in turn dependent on elastic wave velocities, and the value of the devices often lies in the nature of the relationship between any of the parameters, composition, temperature, configuration and velocity. Accordingly, a precisely determined and stable delay time is obtained in an acoustic medium of particular composition and length at a given temperature. Frequency determination, too, is a function of such parameters, and close control is afforded by use of precisely cut and oriented crystalline bodies.

There are, however, device designs in which it is desired to vary velocity, frequency, or other related characteristic while at the same time retaining the stability upon which the elastic nature of the device is premised. Such devices include variable delay time delay lines, and variable frequency acoustic resonators. Devices of this nature may depend upon an effective change in physical configuration, or upon a variation in velocity with some parameter. Examples of the former include the variable delay line in which a signal may be extracted at any of several locations along the line. Examples of the latter include adjustable resonators, in which fine adjustment takes advantage of the dependence of elastic velocity on temperature. This description is concerned with the latter category.

Workers in the acoustic field have proposed many devices requiring a readily adjusted or modulated velocity of elastic wave propagation. Such devices include, in addition to the variable delay line, turnable acoustic lenses, elastic wave deflectors, pulse code modulation elements, and frequency modulators. While several mechanisms have been proposed which result in the requisite variation in elastic wave velocity, such variations have, in general, been of very small magnitude. Examples include: velocity changes resulting from light level incident on a light-sensitive piezoelectric medium, changes in configuration induced in piezoelectric resonators by an electric field, similar change through electrostriction, and velocity changes resulting from changing temperature preferably through a transition point such as a ferroelectric Curie point. Such phenomena, while of considerable interest, have permitted velocity variations only of the order of about two percent.

The present invention depends upon the finding that a particular composition, manganese doped magnetic garnet exemplified by yttrium-iron garnet ($Y_3Fe_5O_{12}$–YIG), manifests a significant change in acoustic velocity with a change in magnitude of applied magnetic field. The value of this finding is enhanced by the already known excellent acoustic qualities of the garnet system. Acoustical Q values of the included compositions are of the order of $10^5$ or greater for frequencies of from about 1 mc./sec. to about 100 mc./sec. at temperatures of the order of 40° C. or greater. Greater quality results when temperature is reduced. Compositions of this invention manifest their greatest velocity change at reduced temperature. Changes of the order of 10 percent and greater have been measured at a temperature of about 100° K. However, while a temperature range for maximum effect is so indicated, velocity change at increased temperature is of generally greater magnitude than that realized for other phenomena upon which device designs have been premised. Illustratively, a change of greater than two per cent in velocity has been observed at room temperature for a composition herein.

Suitable magnetic garnet compositions include modified YIG compositions containing additions designed to alter magnetic saturation and other magnetic qualities. Illustrative materials include aluminum dopings containing up to 1.35 atom aluminum and gallium dopings containing up to 1.25 atom gallium. The effect of these additions is to lower saturation. The use of gallium has excited considerable interest due to the fact that this element strongly prefers to occupy tetrahedrally coordinated sites, with the result that this material evidences a compositional compensation point. Other suitable magnetic garnet materials include the rare earth iron garnets, vanadium-containing compositions, compositions in which the yttrium site is at least partly occupied by bismuth, and, of course, mixed crystals of any of the foregoing.

The magnitude of the dependence of elastic wave velocity on applied field is dependent upon the manganese content of the garnet. Useful results are obtained for inclusions of as little as 0.05 weight percent manganese based on the entire composition, although changes of the order of one percent in velocity require inclusion of at least 0.1 percent by weight manganese, and this value constitutes a preferred minimum for this reason. Maximum manganese content depends somewhat on the tolerance of the particular garnet system, excess amounts resulting in the formation of a different crystal phase. In general, maximum values are of the order of five weight percent, based on the final composition. A preferred maximum lies at about two weight percent on the same basis.

Devices taking advantage of the inventive teachings require application of a magnetic field of sufficient magnitude to at least saturate the material. Saturating fields may vary from a very few oersteds for compensated compositions to about 800 oersteds for spherical samples of otherwise undoped YIG. Saturating field values are also dependent on configuration and temperature, in well-known manner. While such a minimal applied field value is invariably required, velocity change requires a means for varying the field to values substantially above the minimum saturating field. In general, significant changes in velocity result only upon variation of the applied field by at least 100 oersteds over the saturated value, and means for accomplishing such variation is considered to be a prerequisite for the invention.

Detailed description is expedited by reference to the accompanying drawing, in which:

FIG. 1, on coordinates of frequency and applied field, is a plot showing the relationship between resonant frequency and magnetic field in a spherical resonator;

FIG. 2, on coordinates of traversal time and applied field, is a plot showing the time required for an acoustic wave of fixed frequency to traverse a given length of manganese-doped YIG as a function of field;

Figure 1:
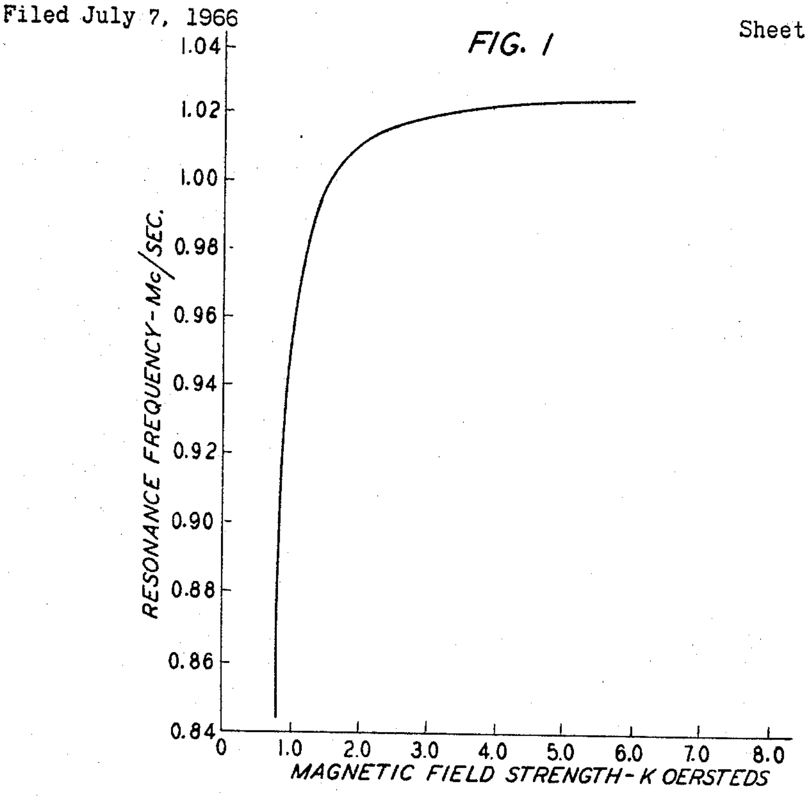
Figure 8:
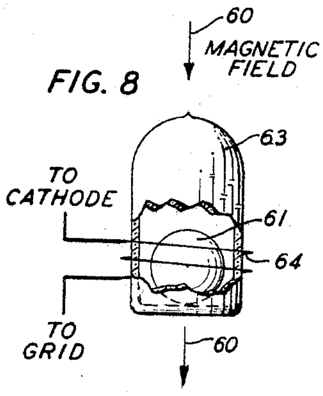
FIG. 8 is a front elevational view, partly in section, of a tuned plate oscillator utilizing a spherical body of manganese-doped magnetic garnet in which the resonant frequency is field dependent.

Referring again to FIG. 1, the data plotted is taken from an experiment conducted on a tuned plate oscillator of the type depicted in FIG. 8, and the nature of the experiment is described in conjunction with that figure. For the purposes of FIG. 1, it is sufficient to note that a sphere of YIG containing 1.3 weight percent manganese was set into vibrational resonance and the resonance frequency was measured for different values of applied field. The low field strength was about 800 oersteds, which results in saturation of the composition in the spherical configuration at the temperature of 77° K. for which the data was collected. The applied field was increased to a value of about 6000 oersteds, at which the curve appears to be virtually asymptotic. The greatest change in frequency, from about 0.84 mc./sec. to over 1.0 mc./sec. was obtained for a field increment of about 800 oersteds. Resonant frequency in a spherical body or any other body is a function of but two parameters, the physical length of the body in the direction of the propagating mode and the velocity for the wave in the same direction. The effective change in length is necessarily minor. The change in resonance frequency must be largely attributed to a change in velocity. This is, of course, verified by the data which was collected from experiments conducted on traveling wave bodies many wave lengths long, as contrasted to the half wave length dimension of the sphere.

Figure 2:
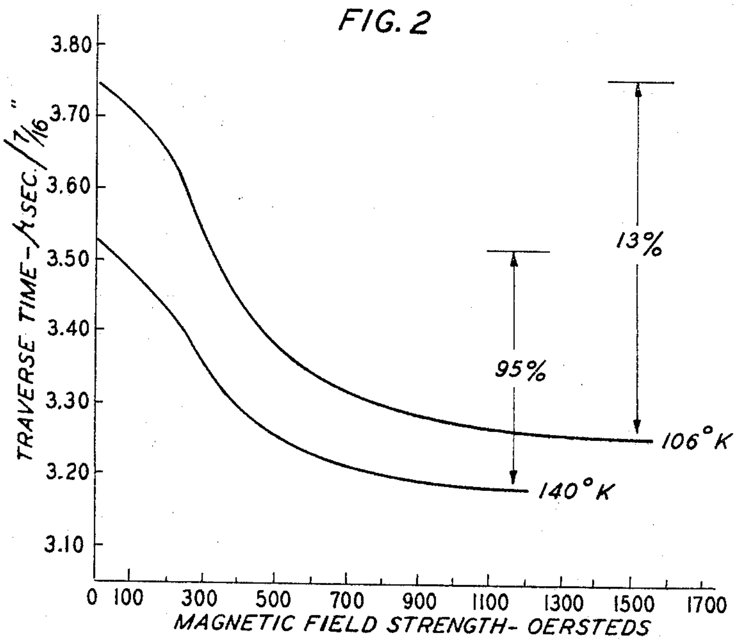

FIG. 2, on coordinates of microseconds required to traverse a 7/16 inch length crystal (although the curve form applies to any length crystal) and applied field in oersteds, is based on data taken from such a traveling wave device. The shape of the experimental body here used was that of a rod having cross-sectional dimensions of 1/16 x 1/16 inch and, as noted, at length of 7/10 inch. The saturation magnetization moment for such a configuration is less than that for a sphere and lies at about 200 gauss. In the experiment responsible for this data, a 17 mc./sec. wave was launched down the rod under the influence of different applied field strengths, and the time required for the wave to reach the end of the rod was determined. This, of course, amounts to use of the crystalline material as a conventional delay line such as that depicted in FIG. 3. Two curves are presented on this figure, one for data measured at 106° K. and a second for data measured at 140° K. From the lower temperature curve it is seen that an overall change in delay time of about 13 percent was introduced with a field change of the order of 1500 oersteds. At 140° K. this change was reduced to about 9.5 percent. Similar experimental data revealed a change of about 2.3 percent at room temperature and changes substantially identical to that of the 106° K. data for still lower temperatures. To afford direct comparison with the data of FIG. 1, the composition selected for this experiment was also manganese doped-YIG, however, containing 2.3 weight percent manganese.

The data in FIG. 2 is taken from a run in which the applied field corresponded in direction with that of the traveling wave. Use of fields in the two orthogonal directions resulted in similar variations in delay time, although of somewhat reduced maximum degree.

Figure 3:
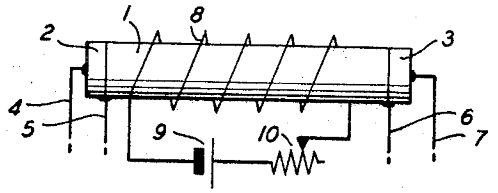
FIG. 3 is a front elevational view of a variable delay time delay line depending for its operation upon a composition herein.

The device of FIG. 3 is a conventional delay line. The acoustic element 1 is composed of a magnetic garnet composition containing a manganese doping in accordance with this invention and is in this instance provided with two transducers 2 and 3 composed, for example, of piezoelectric material and provided with electrodes 4, 5, 6 and 7 connected to signal source and detector, not shown, to provide and detect the electrical signal which is to be delayed. A magnetic field is imposed on body 1 by winding 8, which is energized by D-C source 9 through rheostat 10. Varying the amount of current passing through winding 8 results in a change in the applied field, which in turn causes a variation in the elastic wave velocity, so varying the delay time. It was on equipment of this nature that the data of FIG. 2 was collected.

Figure 4:
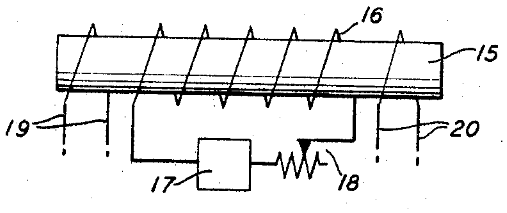
FIG. 4 is a front elevational view of an alternative delay line structure exhibiting a variable delay time as a function of applied field.

The device of FIG. 4 is similar to that of FIG. 3 and may serve the same function. It is composed of crystalline body 15, which may be any of the magnetic garnet compositions herein containing the requisite manganese doping. Provision for varying the applied field across the body is again made by means of encircling winding 16, in turn connected to electrical source 17 through rheostat 18. In this instance, the device serves as its own transducer, windings 19 and 20 performing, respectively, energizing and detecting functions and attached to signal source and detector, not shown. The transducing action depends upon the magnetostrictive nature of all of the magnetic garnet compositions encompassed by the invention.

Figure 5:
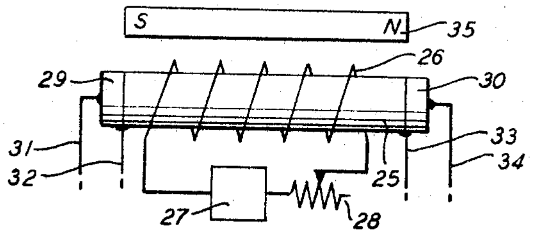
FIG. 5 is a front elevational view of a device alternative to that of FIG. 3, however magnetically biased by means of a permanent magnet.

The device of FIG. 5 is similar to that of FIG. 3, being composed of crystalline body 25 of a material in accordance with the invention, this body being provided with winding 26 connected to electrical source 27 through potentiometer 28, and also being provided with transducers 29 and 30, the latter having associated electron pairs 31 and 32 connected to signal source, not shown, and 33 and 34 connected to detecting means, not shown. It has been noted that all of the devices of this invention necessarily operate with a magnetic field of value at least sufficient to magnetically saturate the magnetic element. In the device of FIG. 5, this minimal field is provided by a permanent magnet 35. Alternatively, biasing may be achieved electromagnetically. In such illustration, the energy source 17 of the device of FIG. 4 may be composed of two separate supplies, one sufficient to saturate, and the second of which is varied so as to produce values in excess of saturation in accordance with the desired delay time.

Figure 6:
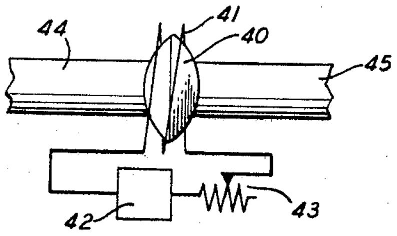
FIG. 6 is a front elevational view of one form of elastic wave lens, the focal length of which may be varied by varying the applied field.

The device of FIG. 6 is an acoustic lens. Here, as elsewhere in this description, the term "acoustic" is intended to be construed, in accordance with common usage, as generically encompassing any elastic wave frequency, whether within the audible range or without. The device consists of functional element 40, which is a double convex lens of a magnetic composition of the invention. This element is provided with a winding 41, which is in turn connected with an electrical source 42, through an adjusting means 43, such circuit resulting at all times in sufficient applied field to at least magnetically saturate element 40. Elastic wave energy in introduced into element 40 via body 44, which is constructed of any suitable low loss material, and wave energy is extracted by means of body 45, also constructed of such material. Adjustment of the amount of current flowing through coil 41 results in a change in the relative elastic velocities of elements 40 and either of 44 and 45, so altering the focal length of the device. Uses for such an arrangement may include focusing the elastic wave energy on the plane of a detector.

Figure 7:
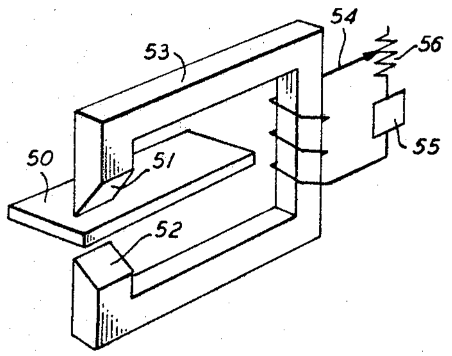
FIG. 7 is a perspective view of an elastic wave switch or deflector in which the wave path is varied under the influence of an applied nonuniform electric field.

The device of FIG. 7 may serve as a sound deflector or switch. It depends for its operation upon a slab 50 of a magnetic garnet composition herein, across which there is imposed a nonuniform magnetic field by tapered pole pieces 51 and 52, forming part of electromagnet 53. The magnet is provided with a winding 54, energized by current source 55, the value of which may be varied by control means 56. Elastic wave energy is propagated lengthwise or through the thickness of slab 50. The arrangement of the depicted element is such as to result in a field nonuniformity in a direction orthogonal to the propagation direction of the elastic wave energy. Since it is the effect of an applied field to result in an increase in elastic wave velocity, the effect on the wave energy is to deflect it in the direction of decreasing field.

The device of FIG. 8 is a tuned plate oscillator which in this instance includes means for producing a magnetic field 60 provided with energizing source and means for varying field strength, not shown, applied across manganese-doped garnet sphere 61. Sphere 61 is contained in an evacuated seal Pyrex tube 63, in which it is free to move and which is in turn surrounded by feedback coil 64, the ends of which are attached as indicated, one to the grid and the other to the cathode of an electron tube. Suitable circuitry is provided to sustain oscillation. Such circuitry may consist of an L–C circuit adjusted to the resonant frequency of the sphere by means of a variable capacitance. The resonance point of the sphere 61 is altered as desired by means of a variable strength applied field 60. The data of FIG. 1 was taken from an experiment in which the apparatus of FIG. 8 was used.

The invention is dependent upon the existence of manganese-doped magnetic garnet material. Materials of this general nature, although without the manganese doping, are in prevalent use. Suitable growth techniques are well known and include those described in U.S. Patents 2,957,827, 3,050,407, and 3,079,240. Dopings of all of the additives encompassed within the invention, even including manganese, have been accomplished by one or another of these techniques.

The description includes several illustrative designs which may be used to accomplish various desired end results. Uses of these and other designs may involve abrupt or digital changes in applied field or may depend upon a continuously varying field, as for analog operation. Fields may be the result of encircling windings, as shown, or may result from other arrangements including coincident circuitry. Such coincident circuitry may simply accomplish the tilting of the direction of magnetization within the crystalline body, so as to change the magnitude of magnetization in, for example, the direction of wave propagation. Such operation is analogous to certain magneto-optic modulators. One focusing and one deflection means have been shown. Alternative structures all depending upon an increase in elastic velocity with applied field are apparent. The person skilled in the field will recognize the very broad applicability of the general principles which have been described.

What is claimed is:

1. Device comprising a crystalline body consisting essentially of a magnetic garnet composition containing at least 0.05 weight percent manganese based on the total composition, together with means for introducing an elastic wave in the said body, and means for impressing a magnetic field of variable field strength on the said body.

2. Device of claim 1 in which the said composition contains at least 0.1 weight percent manganese based on total composition.

3. Device of claim 1 in which the dodecahedral site in the said composition consists essentially of yttrium.

4. Device of claim 1 in which the said elastic wave is a standing wave.

5. Device of claim 4 in which the said body is spherical.

6. Device of claim 5 in which the means for introducing the elastic wave is an encircling coil of electrical conductor.

7. Device of claim 1 in which the said elastic wave is a traveling wave.

8. Device of claim 7 in which the body is rod-shaped.

9. Device of claim 8 in which the means for introducing the elastic wave is a transducer which converts electrical energy to vibrational energy.

10. Device of claim 9 in which the said transducer is piezoelectric.

11. Device of claim 1 in which the said body is of such configuration that the length of the dimension parallel to the direction of elastic wave propagation varies, the maximum value of such dimension being at a central portion of the said body.

12. Device of claim 1 in which the magnetic field is nonuniform in a direction orthogonal to the propagation direction of the said elastic wave.

13. Device of claim 1 in which the resulting magnetic field has a component parallel to the elastic wave.

References Cited

UNITED STATES PATENTS

| | | | |
|---|---|---|---|
| 3,038,861 | 6/1962 | Van Uitert | 252—62.57 |
| 3,215,944 | 11/1965 | Matthews | 330—4.6 |
| 3,307,120 | 2/1967 | Denton et al. | 330—4.6 X |
| 3,113,278 | 12/1963 | Okwit | 333—82 X |
| 3,251,026 | 5/1966 | May et al. | 333—30 X |

BENJAMIN A. BORCHELT, *Primary Examiner.*

G. H. GLANZMAN, *Assistant Examiner.*

U.S. Cl. X.R.

252—62.57; 333—30